(12) United States Patent
Roedel (10) Patent No.: US 11,135,873 B2
(45) Date of Patent: Oct. 5, 2021

(54) CASTER

(71) Applicant: STEINCO Paul vom Stein GmbH, Wermelskirchen (DE)

(72) Inventor: Thorsten Roedel, Wermelskirchen (DE)

(73) Assignee: STEINCO Paul vom Stein GmbH, Wermekskirchen (DE)

( * ) Notice: Subject to any disclaimer, the term of this patent is extended or adjusted under 35 U.S.C. 154(b) by 0 days.

(21) Appl. No.: 16/775,590

(22) Filed: Jan. 29, 2020

(65) Prior Publication Data

US 2020/0238757 A1 Jul. 30, 2020

(30) Foreign Application Priority Data

Jan. 29, 2019 (DE) .................... DE102019102175.8

(51) Int. Cl.
*B60B 33/00* (2006.01)

(52) U.S. Cl.
CPC .......... *B60B 33/00* (2013.01); *B60B 33/0021* (2013.01); *B60B 33/0039* (2013.01); *B60B 33/0049* (2013.01); *B60B 33/0057* (2013.01); *B60B 33/0068* (2013.01); *B60B 33/0073* (2013.01); *B60B 2200/20* (2013.01); *B60B 2360/322* (2013.01); *B60B 2900/116* (2013.01); *B60B 2900/351* (2013.01); *B60B 2900/572* (2013.01)

(58) Field of Classification Search
CPC ... Y10T 16/207; Y10T 16/216; Y10T 16/184; B60B 33/00; B60B 33/0002; B60B 33/006; B60B 7/00; B60B 7/06; B60B 7/061; A47B 91/00; A47B 91/12; A47B 95/043; A47B 2095/046; A47C 19/024
See application file for complete search history.

(56) References Cited

U.S. PATENT DOCUMENTS

| | | | | |
|---|---|---|---|---|
| 2,483,241 | A | 9/1949 | Shepard | |
| 3,166,780 | A * | 1/1965 | Schultz, Jr. | B60B 33/0002 16/21 |
| 3,486,185 | A * | 12/1969 | Gerhard | B60B 33/00 16/18 R |
| D326,221 | S * | 5/1992 | Brule' | B60B 33/00 D8/375 |
| 5,123,143 | A | 6/1992 | Carmack | |
| 5,371,920 | A * | 12/1994 | Rainville | B60B 33/00 128/203.12 |
| 6,125,504 | A | 10/2000 | Richards | |

(Continued)

FOREIGN PATENT DOCUMENTS

| | | | | |
|---|---|---|---|---|
| GB | 2561032 A | 10/2018 | | |
| GB | 2565758 A * | 2/2019 | ............. | B60B 33/00 |

(Continued)

*Primary Examiner* — Chuck Y Mah
(74) *Attorney, Agent, or Firm* — Von Rohrscheidt Patents (57) ABSTRACT

A caster for equipment and furniture, the caster comprising a support element including a top element and a base element, wherein the top element includes an attachment bolt configured to attach the caster and the base element includes a wheel axle that supports at least one wheel, wherein a replaceable substantially circumferential one-piece support element cover made from a synthetic material that provides a continuous design surface is arranged at the support element.

2 Claims, 7 Drawing Sheets

(56) References Cited

U.S. PATENT DOCUMENTS

| | | | | |
|---|---|---|---|---|
| 10,442,246 B2 * | 10/2019 | Barker | ................ | B60R 19/54 |
| 2009/0025177 A1 * | 1/2009 | Schioppa | ................ | B60B 7/04 |
| | | | | 16/18 CG |

FOREIGN PATENT DOCUMENTS

| | | | | | |
|---|---|---|---|---|---|
| JP | 2000203207 A | * | 7/2000 | ............ | B60B 33/00 |
| JP | 2001161755 A | * | 6/2001 | | |
| JP | 2004058954 A | * | 2/2004 | | |

* cited by examiner

CASTER

RELATED APPLICATIONS

This application claims priority from and incorporates by reference German Patent Application 10 2019 102 175.8 filed on Jan. 29, 2019.

FIELD OF THE INVENTION

The invention relates to a caster for equipment and furniture, the caster including a support element including a top element and a base element, wherein the top element includes an attachment bolt configured to attach the caster and the base element includes a wheel axle that supports at least one wheel.

BACKGROUND OF THE INVENTION

Casters of a generic type are known in the art in various engineering and design configurations.

Customers request more and more individual configurations and these generic casters have the disadvantage that production figures for individual casters go down and the cost for producing a plurality of variants increases.

BRIEF SUMMARY OF THE INVENTION

Thus, it is an object of the invention to provide a new caster for equipment and furniture in order to be able to produce a large number of casters that are individually configured according to customer specifications and producible in a cost-effective manner.

The object is achieved by a caster for equipment and furniture, the caster comprising a support element including a top element and a base element, wherein the top element includes an attachment bolt configured to attach the caster and the base element includes a wheel axle that supports at least one wheel, wherein a replaceable substantially circumferential one-piece support element cover made from a synthetic material that provides a continuous design surface is arranged at the support element.

The caster according to the invention has the advantage that it can be customized according to customer requirements inexpensively by attaching different support element covers.

In this context, it is furthermore advantageous that the caster itself can be produced in high volume and thus in a cost-effective manner, put in storage and then customized quickly according to customer requirements with a desirable design and delivered since a plurality of different support element covers is available.

In an advantageous embodiment of the invention, the support element cover is made from polypropylene. This material is inexpensive, does not absorb moisture and pre-drying is not required.

The support element cover is advantageously interlockable by a plurality of interlocking devices at the support element. This type of attachment can be produced and mounted in a simple manner and facilitates a continuous design surface without visible attachment devices.

BRIEF DESCRIPTION OF THE DRAWINGS

Further advantages of the invention can be derived from the subsequent description of an embodiment with reference to drawing figures, wherein.

DETAILED DESCRIPTION OF THE INVENTION

A single wheeled caster is overall designated in the drawing figures with the reference numeral 10.

Figure 1:
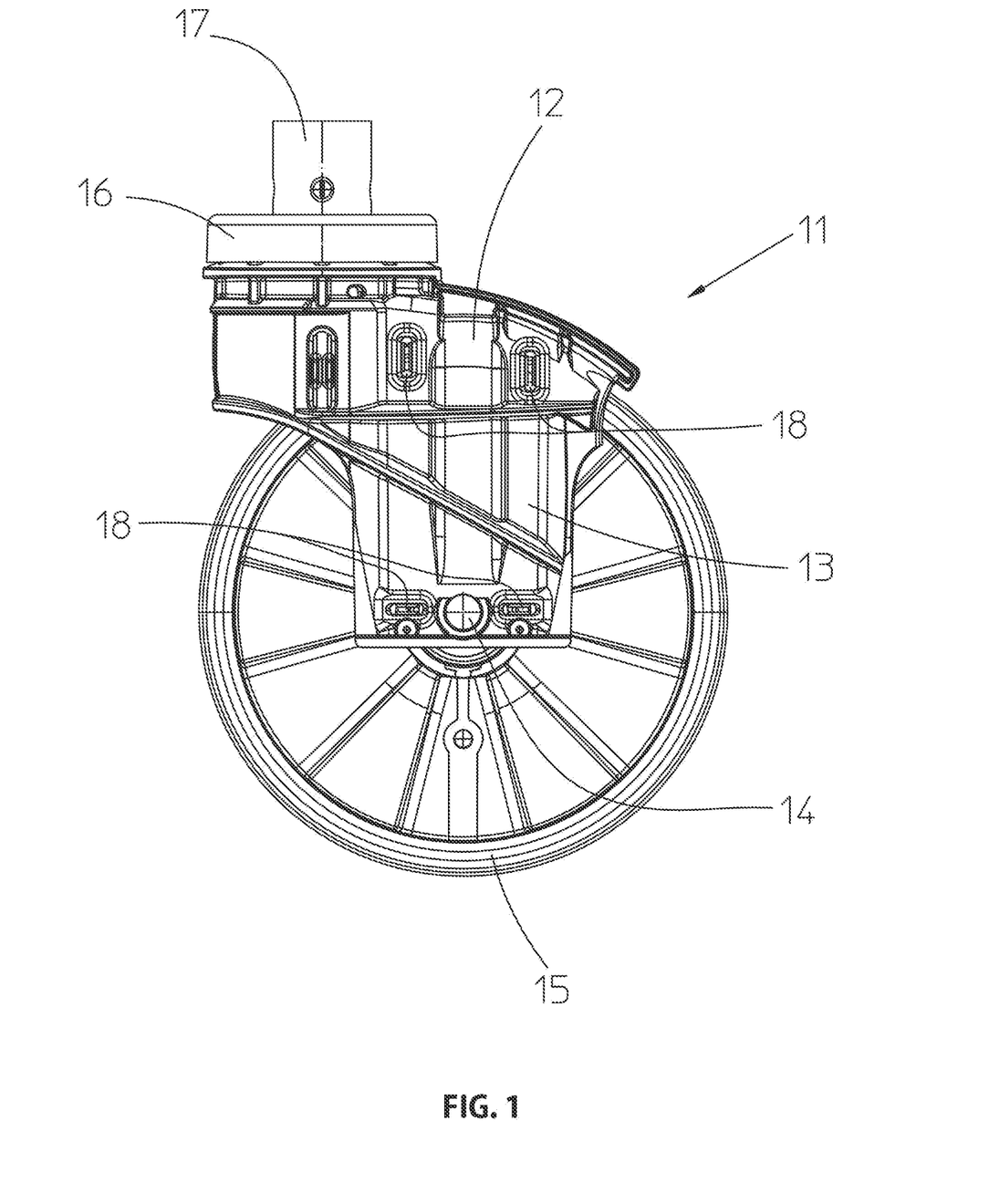
FIG. 1 illustrates a side view of a single wheel caster without support element cover.

FIG. 1 illustrates a single wheel caster 10 in a side view. FIG. 1 shows a support element (support housing) 11 including a top element 12 and base element 13. A wheel 15 is rotatably arranged on a wheel axle 14 at the base element 13. A swivel bearing is arranged at the top element 12 under a bearing cover 16 wherein an attachment bolt 17 for arrangement e.g. at a hospital bed protrudes upward from the bearing cover 16.

Four receiving portions 18 for interlocking devices are visible at the support element 11.

Figure 2:
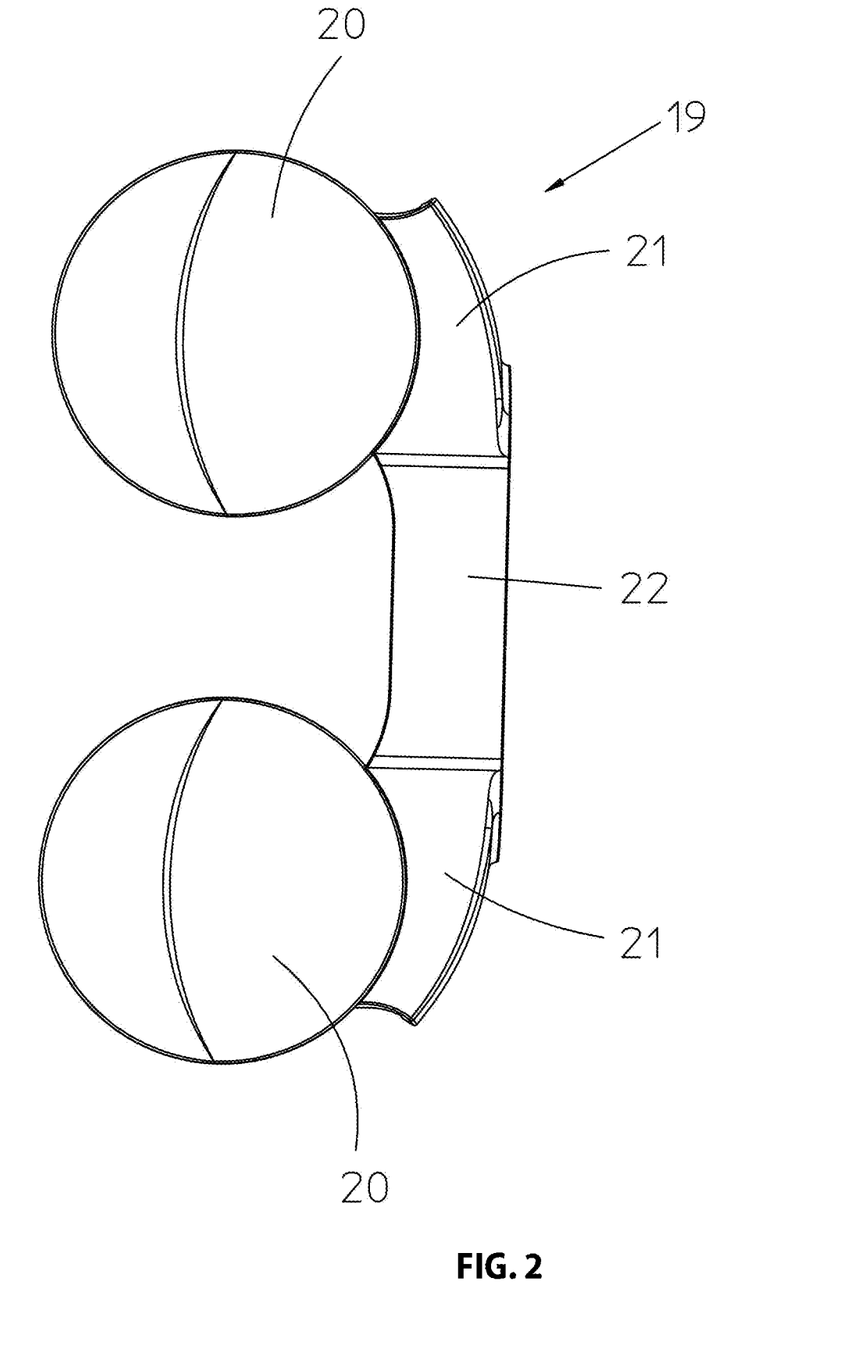
FIG. 2 illustrates a top view of the support element cover.
Figure 3:
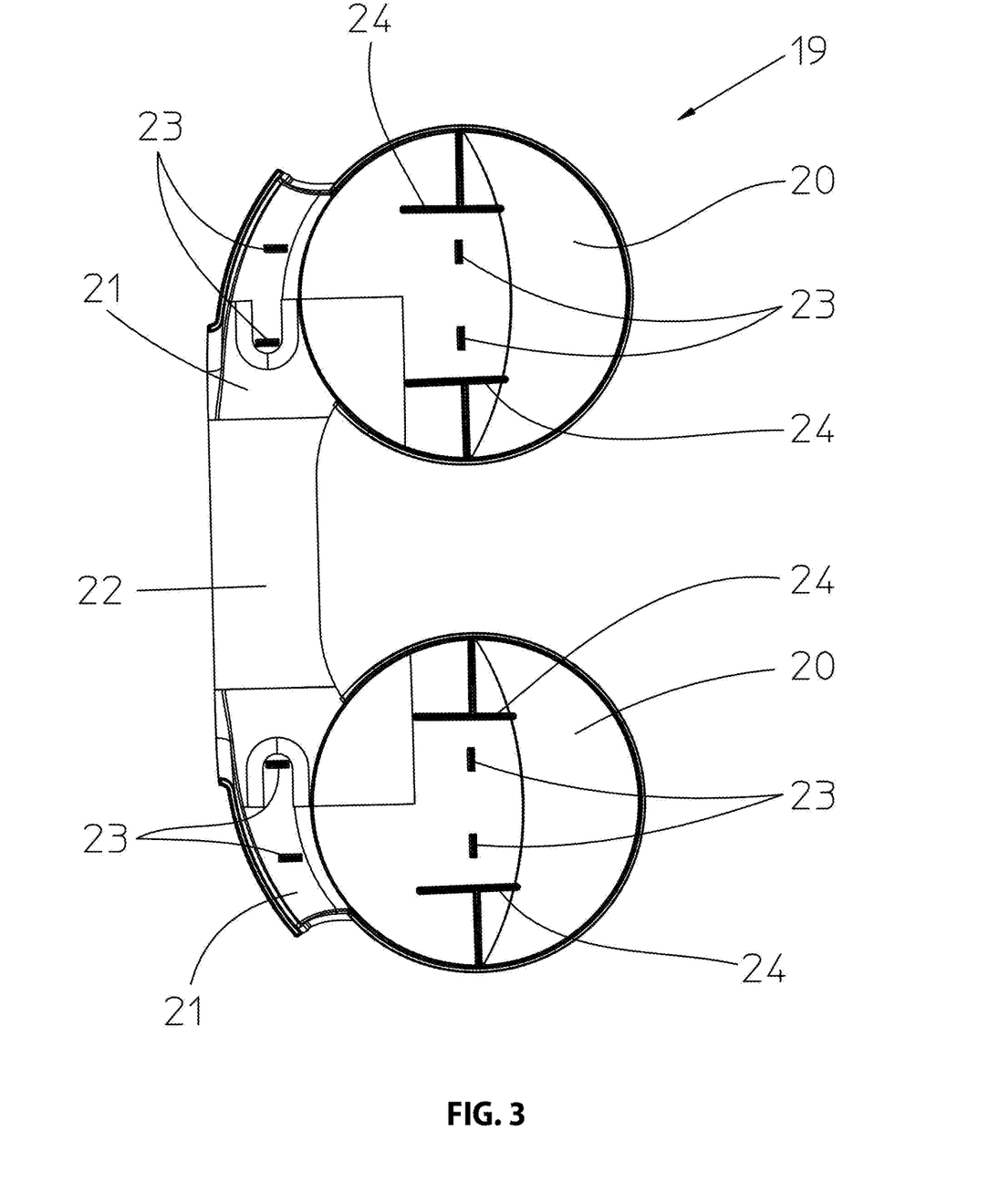
FIG. 3 illustrates an interior view of the support element cover according to FIG. 2.
Figure 4:
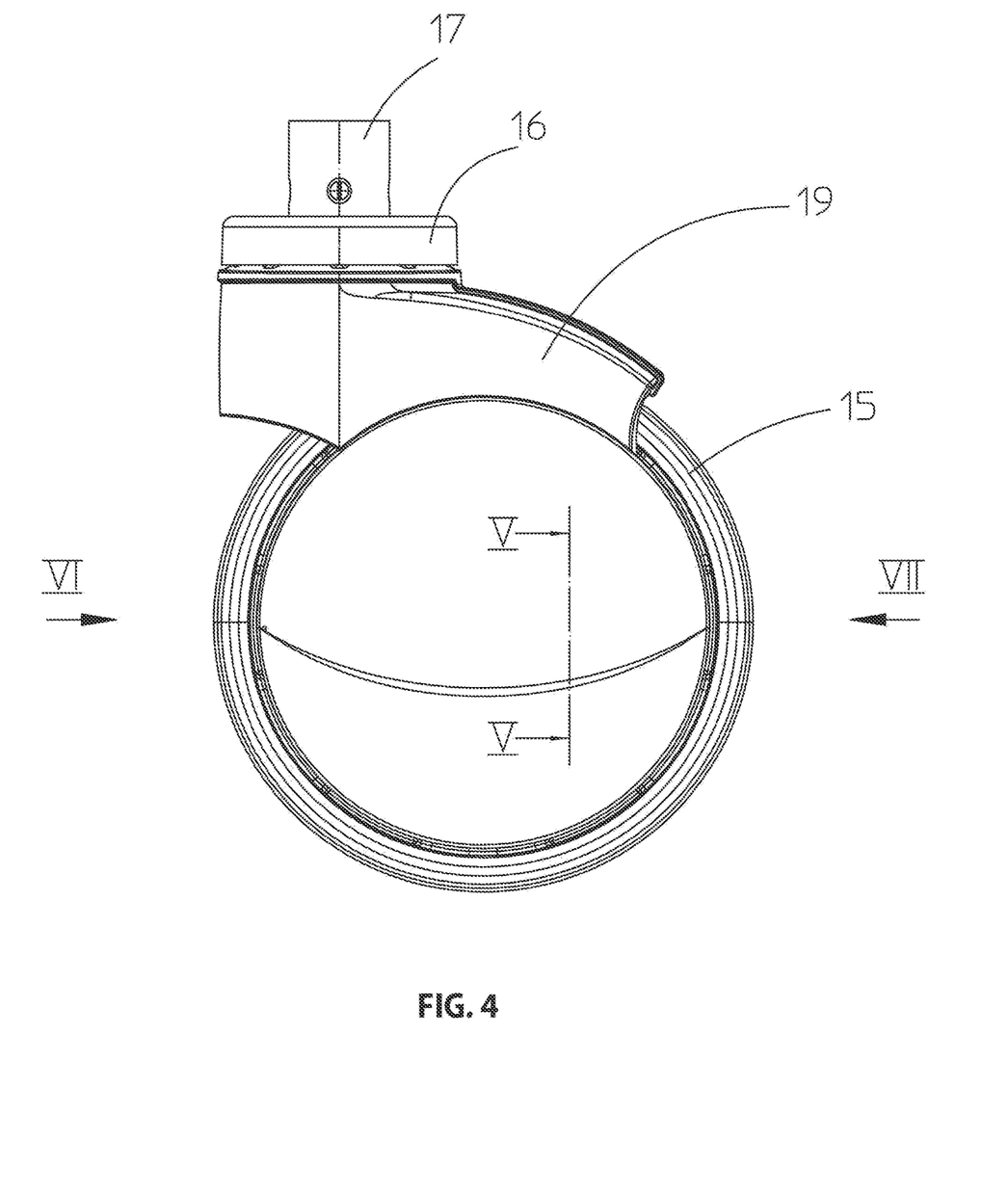
FIG. 4 illustrates the single wheel caster according to FIG. 1 with the support element cover arranged thereon.

FIG. 2 illustrates a support element cover 19 that is spread out flat and viewed from outside. FIG. 3 illustrates an inside view of the same support element cover 19. FIG. 4 illustrates the single wheel caster 10 with the support element cover 19 arranged thereon.

The support element cover 19 illustrated in FIG. 2 is made from a synthetic material, advantageously polypropylene, and includes two wheel cover portions 20, two support element cover portions 21, and a flexible center element 22.

As evident from FIG. 3, the inner surfaces of the support element cover 19 respectively include two interlocking elements 23 in an area of the wheel cover portions 20 and of the support element cover portions 21 which are interlocked in the support element 11 in an assembled condition of the caster as will be described infra. Additionally inner surfaces of the wheel cover portions 20 are provided with two respective support portions 24 which engage the support element 11 by form-locking after attachment of the support element cover 19 at the support element. The support portions 24 react lateral forces at the support element 11 so that the interlocking elements 23 do not carry any load.

Figure 5:
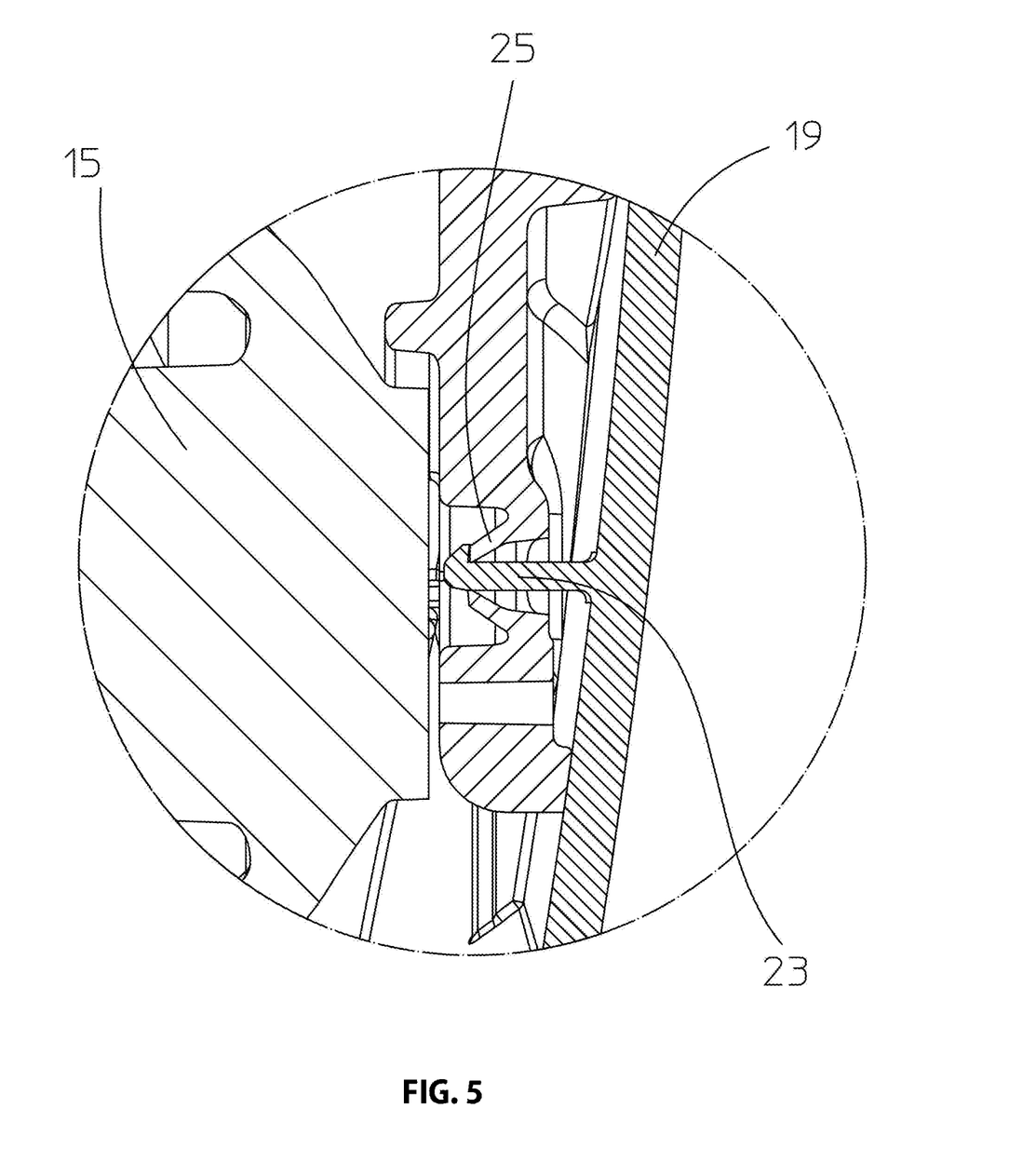
FIG. 5 illustrates a blown-up detail sectional view of an interlocking device attached according to sectional lines V-V in FIG. 4.

FIG. 5 illustrates a blown-up partial sectional view according to the sectional line V-V in FIG. 4. Therein it is evident that the support element cover 19 reaches behind an interlocking protrusion 25 formed at the support element 11 using an interlocking device 23. The support element cover 19 is reliably attached at the single wheel caster 10 by two interlocking devices respectively arranged at each wheel cover portion 20 and at each support element cover portion 21.

Figure 6:
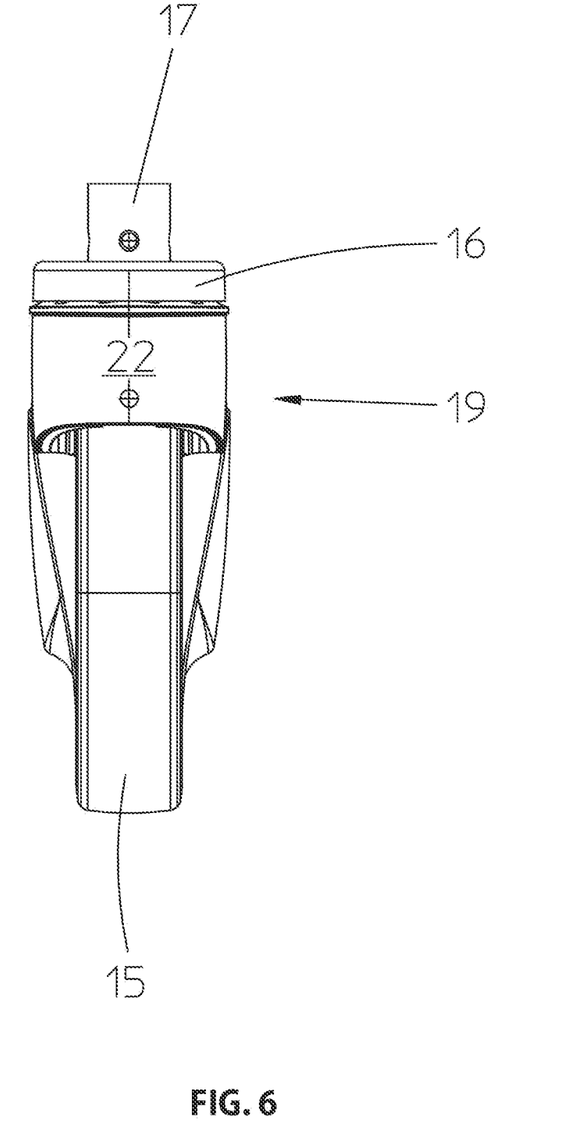
FIG. 6 illustrates a face view of the single wheel caster according to view arrow VI in FIG. 4.
Figure 7:
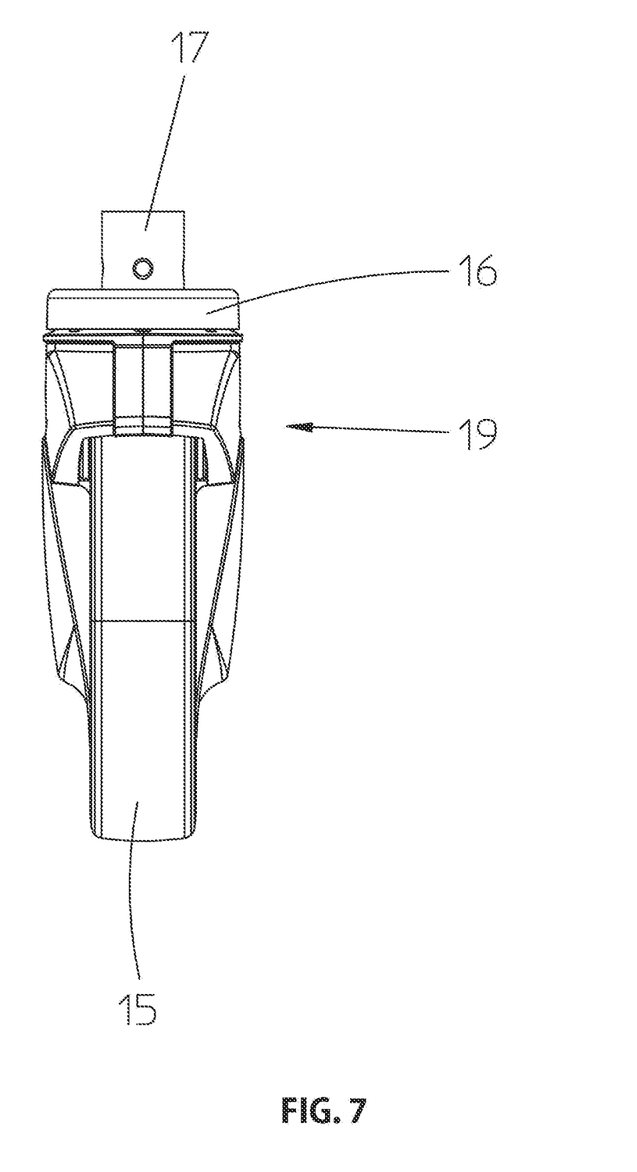
FIG. 7 illustrates a face view of the single wheel caster according to view arrow VII in FIG. 4.

Last not least, FIGS. 6 and 7 illustrate face views of the single wheel caster 10 including the support element cover 19 according to the view arrows VI and VII in FIG. 4.

REFERENCE NUMERALS AND DESIGNATIONS

10 Single wheel caster
11 Support element

12 Top element
13 Base element
14 Wheel axle
15 Wheel
16 Bearing cover
17 Attachment bolt
18 Receiving portion for interlocking device
19 Support element cover
20 Wheel cover portion
21 Support cover portion
22 Flexible center element
23 Interlocking element
24 Support portion
25 Interlocking protrusion

What is claimed is:

1. A caster for equipment and furniture, the caster comprising:
   a support element including a top element and a base element,
   wherein the top element includes an attachment bolt including an attachment bolt axis and configured to attach the caster at the equipment and the furniture and the base element includes a wheel axle that defines a wheel axis and supports at least one wheel so that the base element swivels about the attachment bolt axis and the wheel rotates about the wheel axis,
   wherein a replaceable substantially circumferential one-piece support element cover integrally made from a synthetic material that provides a continuous design surface is arranged at the support element,
   wherein the replaceable substantially circumferential one-piece support element cover includes two circular wheel cover portions that are connected by a flexible centerpiece,
   wherein the two circular wheel cover portions cover the support element and circular portions of the wheel, and
   wherein the flexible centerpiece is bent about a bending axis that is parallel to the attachment bolt axis when the replaceable substantially circumferential one-piece support element cover is fixed at two sides of the support element that face in opposite directions with respect to the wheel axis.

2. The caster according to claim 1, wherein the support element cover is made from polypropylene.

\* \* \* \* \*